Figure 1:
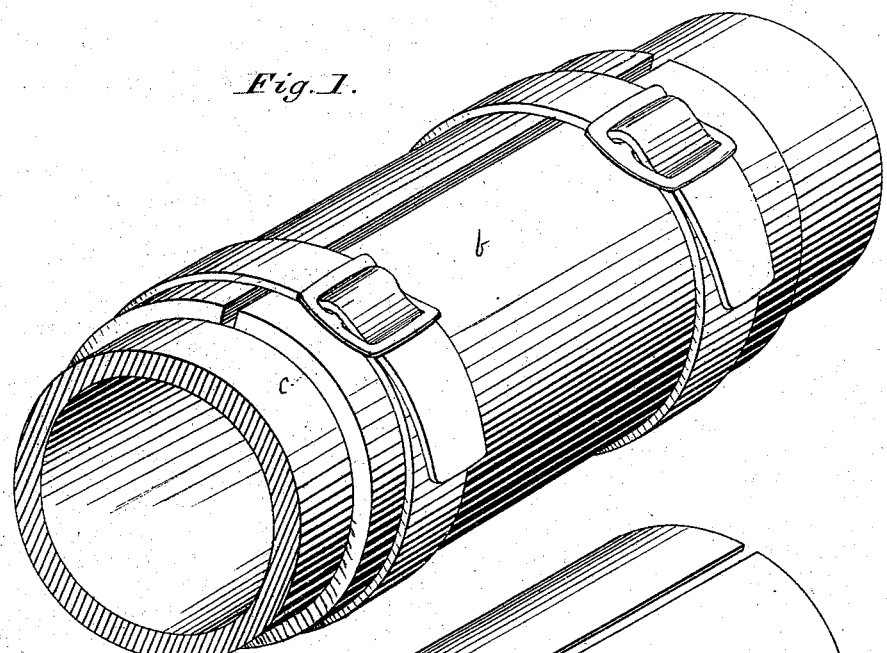

W. W. WHITCOMB.
Leak-Stoppers for Hose.

No. 158,554.  Patented Jan. 5, 1875.

Witnesses:

Inventor:
W. W. Whitcomb.

UNITED STATES PATENT OFFICE.

WILLIAM W. WHITCOMB, OF BOSTON, MASSACHUSETTS.

IMPROVEMENT IN LEAK-STOPPERS FOR HOSE.

Specification forming part of Letters Patent No. 158,554, dated January 5, 1875; application filed February 16, 1874.

*To all whom it may concern:*

Be it known that I, WILLIAM W. WHITCOMB, of the city of Boston, in the State of Massachusetts, have invented a Spring-Sleeve for Hose, designed for stopping leaks in hose and other tubing used for the conveyance of water, of which the following is a specification:

My invention relates to the means for temporarily stopping leaks in hose or other tubing when in use for the conveyance of water, under circumstances that require the application of a remedy without delay, as in the case of the bursting of hose during the progress of a fire. The remedy commonly resorted to in such a case is to take out the leaking section, involving often the loss of invaluable time; and the object of my invention is to quickly stop the leak without taking out the section in which it occurs.

My device consists in a sleeve made of vulcanized rubber, or other suitable material, in the form of a short section of a cylinder, from eight to ten inches long, slit throughout its length, in which is incorporated, when the sleeve is vulcanized, a spring of tempered sheet-steel, and to which are riveted two or more leather straps, with buckles attached.

When a leak occurs in hose at a fire, and it is desired to use my device, the sleeve is sprung upon the hose at the point of leakage, without loss of time, and while the engine continues to play. It is then made tight by means of the straps, the longitudinal slit in the sleeve permitting it to be opened against the spring sufficiently for this purpose, and the spring having strength enough to hold the sleeve temporarily in place, and to partially resist the pressure of the water while it is being more perfectly adjusted and the straps are being drawn. This is the main purpose of the spring, which I regard as a principal feature of my invention.

The sleeve should have an interior diameter (measured as if a perfect cylinder) a little less than the exterior diameter of the hose for which it is intended, so that when the straps are drawn tight the edges of the slit shall not meet. The spring should extend to within about one-quarter of an inch of all the edges of the sleeve. It should be flexible enough to permit the sleeve to be sprung around the hose when under full pressure of the water, and at the same time strong enough to hold it temporarily in place without the aid of the straps. I prefer to make the spring in a single piece, with perforations at suitable points for the rivets by which the straps are put on, and with from six to twelve other and larger perforations, the better to incorporate the spring with the rubber covering. The perforations also facilitate the tempering of the spring.

The best mode I have found of making the device described, in other respects, is to interpose the spring between two or more sheets of two-ply rubber canvas, such as is used for hose, covering the canvas outside and in with a sheet of soft rubber, about one-sixteenth of an inch thick, and vulcanizing the whole together into the form described, and then riveting on the straps. For rubber or canvas hose, with a reasonably smooth exterior surface, my device, made as above described, answers its purpose perfectly. But when the sleeve is intended for hose, the surface of which is made irregular by rivets or prominent seams, the inner lining of soft rubber is preferably made thicker, say, three-eighths of an inch, and the spring shorter, so that it shall extend only to within about one and one-half inch of the ends of the sleeve. Constructed in this mode, and with three straps, two of them on the extreme ends, the sleeve is measurably useful in checking leakage in hose such as last referred to, but I have not found it altogether effectual.

Instead of rubber or similar material, two sheets of heavy leather may be used, the spring being stitched or otherwise fastened between them, but with leather or other material not impervious to water. The spring suffers from rust, against which the rubber completely protects it.

Figure 2:
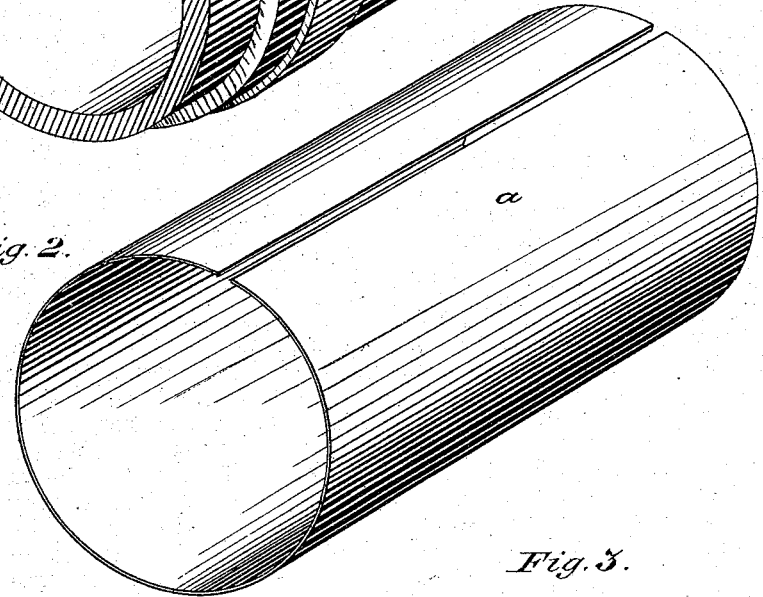
Figure 3:
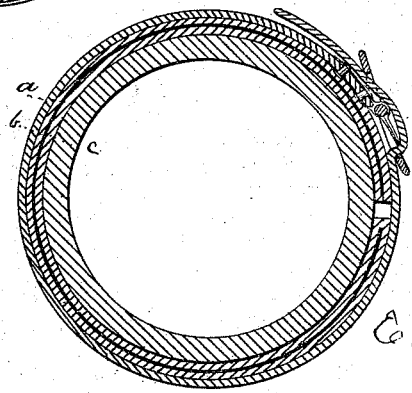

Figure 1 shows the sleeve in perspective. Fig. 2 is a perspective view of the spring described. Fig. 3 shows in cross-section the sleeve made fast around a piece of hose, in which *a* is the spring, and *b* and *c* the coverings.

I claim—

A spring-sleeve for hose-pipe, constructed substantially as herein described, having a spring of one sheet of steel, with suitable covering.

WILLIAM W. WHITCOMB.

Witnesses:
JAMES LEE, Jr.,
WM. ASPINWALL.